(12) United States Patent
Brendel et al.

(10) Patent No.: US 7,804,676 B2
(45) Date of Patent: Sep. 28, 2010

(54) HYBRID DISCOIDAL/TUBULAR CAPACITOR

(75) Inventors: Richard L. Brendel, Carson City, NV (US); John Roberts, Carson City, NV (US); Jason Woods, Carson City, NV (US); Robert A. Stevenson, Canyon Country, CA (US); Warren S. Dabney, Orchard Park, NY (US)

(73) Assignee: Greatbatch Ltd., Clarence, NY (US)

( * ) Notice: Subject to any disclaimer, the term of this patent is extended or adjusted under 35 U.S.C. 154(b) by 461 days.

(21) Appl. No.: 11/943,419

(22) Filed: Nov. 20, 2007

(65) Prior Publication Data

US 2009/0128986 A1     May 21, 2009

(51) Int. Cl.
*H01G 4/35* (2006.01)
(52) U.S. Cl. .................. 361/302; 361/301.3; 361/502; 361/503; 361/509; 361/512
(58) Field of Classification Search .................. 361/302, 361/303–305, 306.3, 308.1, 311–313, 301.1, 361/306.1, 502–504, 508–512
See application file for complete search history.

(56) References Cited

U.S. PATENT DOCUMENTS

| | | | |
|---|---|---|---|
| 5,825,608 A | * | 10/1998 | Duva et al. .................. 361/302 |
| 5,905,627 A | * | 5/1999 | Brendel et al. ............... 361/302 |
| 5,959,829 A | * | 9/1999 | Stevenson et al. ........... 361/302 |
| 6,233,135 B1 | * | 5/2001 | Farahmandi et al. ........ 361/502 |
| 6,426,865 B2 | * | 7/2002 | Kasahara et al. ............ 361/512 |
| 6,456,481 B1 | * | 9/2002 | Stevenson .................... 361/302 |
| 6,507,479 B2 | * | 1/2003 | Saito et al. ................... 361/502 |
| 6,545,854 B2 | | 4/2003 | Trinh et al. |
| 6,701,176 B1 | | 3/2004 | Halperin et al. |
| 6,906,911 B2 | * | 6/2005 | Ikeda et al. .................. 361/502 |
| 2006/0247684 A1 | | 11/2006 | Halperin et al. |
| 2007/0112398 A1 | | 5/2007 | Stevenson et al. |

* cited by examiner

*Primary Examiner*—Nguyen T Ha
(74) *Attorney, Agent, or Firm*—Kelly Lowry & Kelley, LLP (57) ABSTRACT

A hybrid capacitor includes a body of dielectric material having spaced-apart first and second surfaces. A first electrode is associated with the first surface. A second electrode is associated with the second surface. One or more third electrodes are transversely disposed within the dielectric body between the first and second electrodes. Either the first or second electrode is not conductively coupled to any electrode transversely extending into the body. The resulting arrangement provides a hybrid capacitor having characteristics of both a tubular capacitor and a discoidal capacitor.

12 Claims, 9 Drawing Sheets

HYBRID DISCOIDAL/TUBULAR CAPACITOR

BACKGROUND OF THE INVENTION

The present invention generally relates to ceramic capacitors, such as discoidal filter and chip capacitors. More particularly, the present invention relates to a hybrid capacitor having a design and arrangement of components which gives it both characteristics of a discoidal as well as a tubular capacitor.

Figure 1:
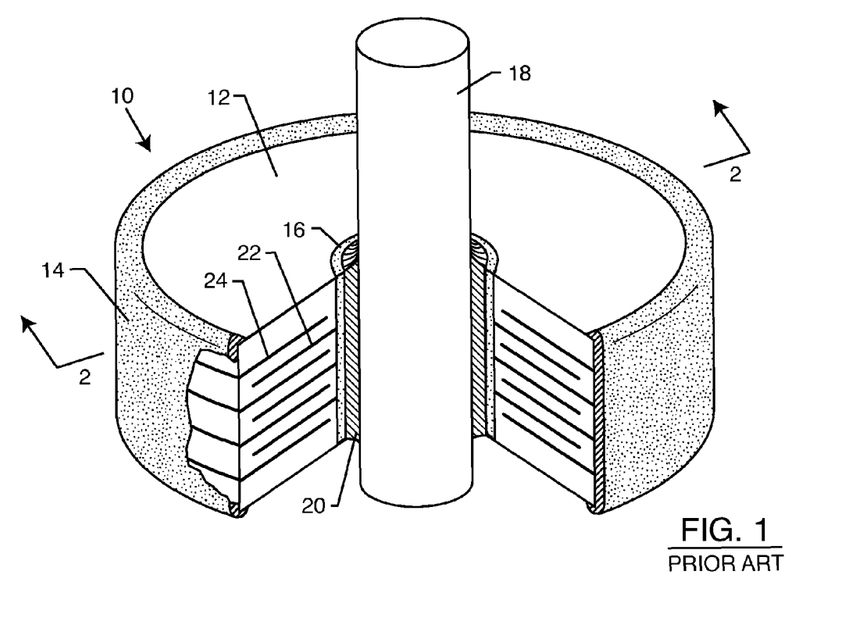
FIG. 1 is a partially sectioned perspective view of a prior art multi-layer unipolar feedthrough capacitor.
Figure 2:
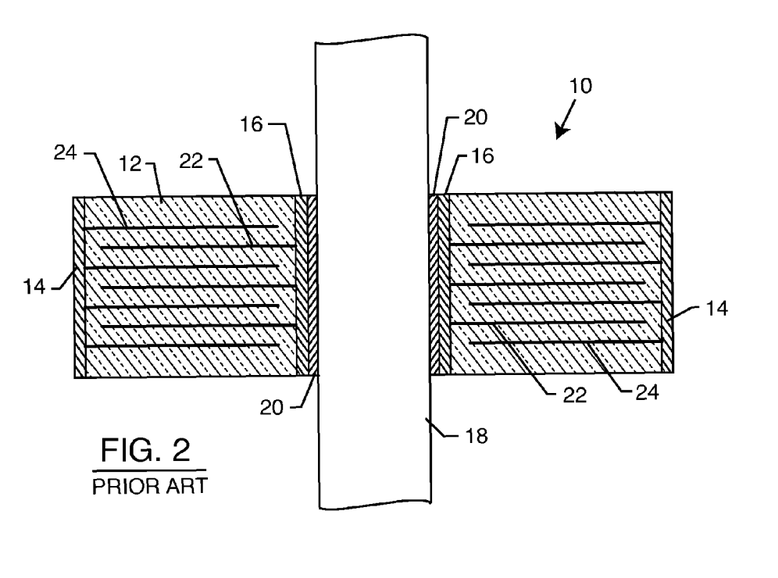
FIG. 2 is a cross-sectional view taken generally along line 2-2 of FIG. 1.

Discoidal feedthrough capacitors are well known in the prior art and are used in a variety of electromagnetic interference (EMI) filtering applications. FIGS. 1 and 2 illustrate a typical EMI filtering discoidal feedthrough capacitor 10. The capacitor 10 includes a body 12 typically comprised of dielectric material. The capacitor 10 includes an outer metallization 14 and an inner metallization 16 lining a through hole, in this case a single center passageway through which a lead wire or pin 18 extends. The lead wire 18 is conductively coupled to the inner metallization 16, such as by means of conductive material 20.

In the prior art feedthrough capacitors, as illustrated in FIGS. 1 and 2, a plurality of active electrode plates 22 extend from the inner metallization 16, and a plurality of ground electrode plates 24 extend from the outer metallization 14, in spaced apart and stacked relationship so as to overlap each other. The one or more lead wires 18 passing through the one or more center holes of the capacitor 10 carry undesirable frequency signals. The capacitor 10 is a very efficient high frequency filter because of its extremely low inductance and broadband frequency attenuation characteristics.

However, a disadvantage of prior art discoidal feedthrough capacitors is that they are relatively costly to manufacture as compared to rectangular MLCC capacitors. Another disadvantage is that great care must be taken when the capacitors are in small sizes for high voltage applications, such as those for implantable cardioverter defibrillators. In medical implant applications, it is necessary to use gold brazes or other similar high temperature, biocompatible connections to make electrical and mechanical attachments to the capacitor and to conducting ground plane surfaces. Thus, it is very important, particularly in biomedical applications, that the capacitor be very strong in compression, sheer and torsion. The reason for this is that microfractures can occur which can lead to latent defects. For example, in a cardiac pacemaker, the shorting of such a capacitor could lead to the complete failure of the cardiac pacemaker and would, of course, be life-threatening. However, the capacitor must be as small and volumetrically efficient as possible as it is desirable to maintain the devices which are implanted as small as feasible.

Figures 3, 4, 5:
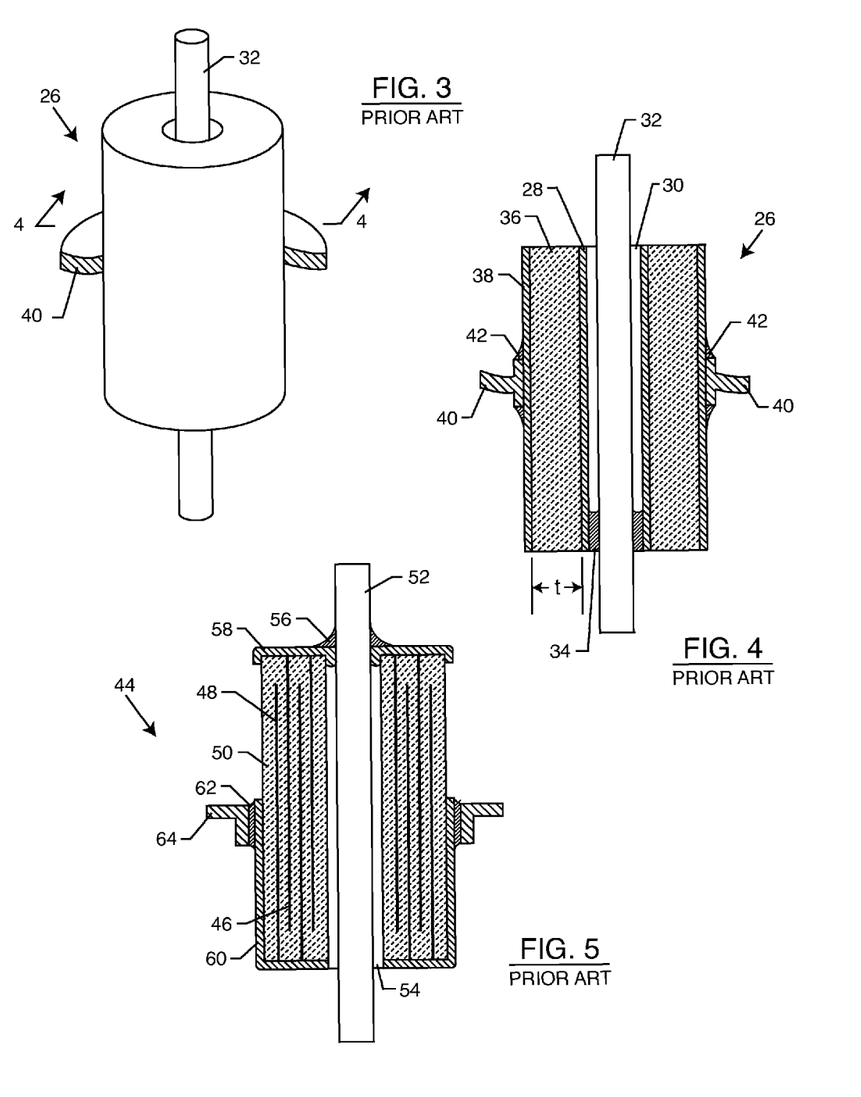
FIG. 3 is a perspective view of a prior art single wall tubular capacitor.
FIG. 4 is a cross-sectional view taken generally along line 4-4 of FIG. 3.
FIG. 5 is a cross-sectional view illustrating a prior art multi-layer tubular capacitor.

With reference now to FIGS. 3 and 4, a prior art single wall tubular capacitor 26 is illustrated. With particular reference to the cross-sectional view of FIG. 4, one can see that there is an inside diameter metallization surface 28 lining the central passageway 30 of the capacitor 26. A lead wire or pin 32 extends through the passageway 32 and is conductively coupled, such as by material 34, to the inner metallization 28.

On the outer surface of the dielectric body 36 is an outer metallization 38. This is conductively coupled to a conducting ground plane surface 40, such as by an electrical and/or mechanical attachment 42. It is the overlap of the inside diameter metallization 28 and the outside diameter metallization 38 surfaces across dielectric material 36 that forms the feedthrough capacitance.

A significant disadvantage of such prior art tubular capacitors 26 is that if the wall thickness "t" is made sufficiently large enough so that the capacitor 26 is mechanically robust, then the capacitance drops significantly. It is a basic principle of all capacitors that as one increases the dielectric thickness there is an inverse relationship and the capacitance drops. However, if one were to make the dielectric thickness "t" very thin, one could achieve a relatively high capacitance value. However, the resulting structure would be very fragile and difficult to manufacture. This would also present drawbacks in medical implant applications where it is necessary to use gold brazes or other similar high temperature, biocompatible connections 42 to make electrical and mechanical attachments between the capacitor 26 and a conducting ground plane surface 40.

With reference now to FIG. 5, another tubular capacitor 44 is illustrated. The tubular capacitor 44 has been wound with active 46 and ground 48 electrodes within the dielectric material so as to be in an overlapping and parallel multi-layer configuration. An electrical lead wire or pin 52 extends through the passageway 54 of the capacitor 44, and is electrically attached 56 to an upper metallization 48, conductively coupled to the active electrode plates 46. A lower ground metallization 60 is conductively coupled to the ground electrode plates 48, and also conductively coupled, by material 62 to the ground plane structure 64.

While such multi-layer tubular capacitors 44 solve some of the structural problems otherwise associated with tubular capacitors, such as capacitor 26 illustrated in FIGS. 3 and 4, however, they are very expensive to manufacture and it is very difficult to maintain dimensional controls. Accordingly, the multi-layer structure illustrated in FIG. 5 is not commonly used.

Figure 6:
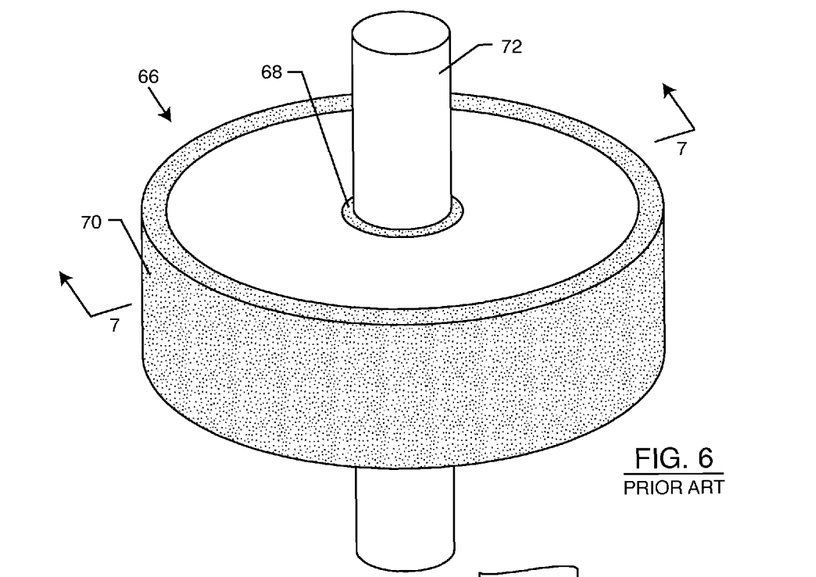
FIG. 6 is a perspective view of a prior art discoidal capacitor.
Figure 7:
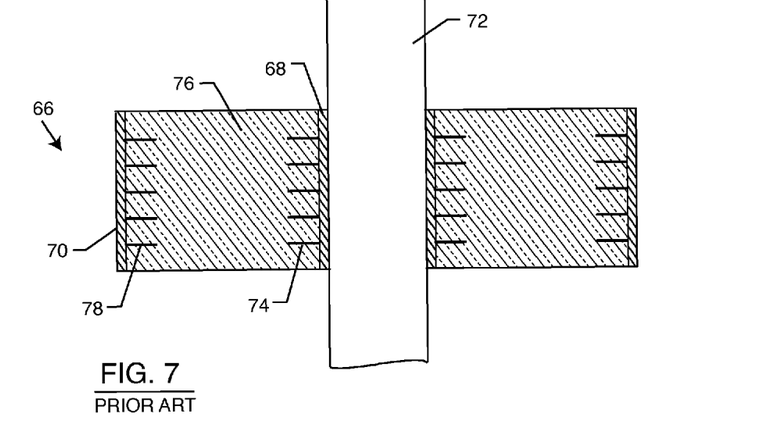
FIG. 7 is a cross-sectional view taken generally along line 7-7, illustrating the non-overlapping electrode arrangement of the capacitor.

U.S. Pat. No. 6,545,854 to Trinh et al. discloses a fringe-field, non-overlapping electrodes discoidal feedthrough ceramic filter capacitor. The capacitor 66 illustrated in FIGS. 6 and 7 is illustrative of the teachings of the '854 patent. The capacitor 66 includes an inner diameter metallization 68, and an outer metallization 70. An electrical lead wire or pin 72 extends through the passageway, and is conductively coupled to the inner diameter metallization 68. As disclosed in the '854 patent, there can be multiple passageways and electrical leads 72 passing through the capacitor 66. As illustrated in FIG. 7, there are a plurality of active electrodes 74 extending from the inner diameter metallization 68 and into the dielectric body 76. There are also a plurality of ground electrode plates 78 extending from the outer diameter metallization 70 and into the dielectric body 76. Trinh et al. teach, as illustrated in FIG. 7, that the plurality of ground and active electrode plates 74 and 78 do not overlap.

However, this capacitor 66 has been found to be very inefficient because the entire capacitance depends upon the fringe effects between the opposing electrode tips of the active electrode plates 74 and ground electrode plates 78. In addition, this is particularly disadvantageous for high voltage applications, in that, this creates what amounts to a tip-to-tip type of spark gap. It is a basic principle of high voltage engineering to avoid sharp points, particularly when you have two sharp points coming towards one another. Accordingly, if there were any kind of internal delamination, or what is known in the industry as a knit-line defect, between any of the opposed electrode ends 74 and 78, the high voltage field would rapidly propagate from tip-to-tip and short out the capacitor 66.

Accordingly, there is a continuing need for a mechanically robust, yet very small hybrid tubular discoidal capacitance structure, which has the characteristics of a discoidal feedthrough capacitor as well as a tubular capacitor. The present invention fulfills these needs, and provides other related advantages.

SUMMARY OF THE INVENTION

The present invention resides in a hybrid capacitor having characteristics of both a discoidal as well as a tubular capacitor. In a particularly preferred embodiment, the hybrid capacitor is adapted for use in biomedical applications where the capacitor is sufficiently strong in compression, shear and torsion such that gold brazes or other similar high temperature, biocompatible connections to make electrical and mechanical attachments to the capacitor and the conducting ground plane surfaces can be made.

In one embodiment, the hybrid capacitor generally comprises a body of dielectric material having spaced-apart first and second surfaces. A first electrode is associated with the first surface. A second electrode is associated with the second surface. The first and second electrodes cooperatively have the characteristics of a tubular capacitor. A third electrode is transversely disposed within the dielectric body between the first and second electrodes. The first, second and third electrodes cooperatively have the characteristics of a discoidal capacitor. At least one of the first and second electrodes is disbursed on the associated first or second surface only, and is not conductively coupled to any electrode transversely extending into the body.

The third electrode may be disposed within the dielectric body without being conductively coupled to either the first or second electrodes. Alternatively, the third electrode is conductively coupled to the first electrode. In yet another embodiment, the third electrode is conductively coupled to the second electrode.

Typically, the third electrode comprises a set of electrode plates. A first plurality of the electrode plates are conductively coupled to either the first or second electrode. A second plurality of the electrode plates are interleaved with the first plurality of electrode plates and are not conductively coupled to either the first or second electrode.

The hybrid capacitor may comprise a body of dielectric material having spaced-apart first and second surfaces. A first electrode is associated with the first surface, and a second electrode is associated with the second surface. A plurality of third electrodes are transversely disposed within the dielectric body between the first and second electrodes. Free ends of the plurality of third electrodes are in generally equally spaced relation to at least one of the first and second electrodes. The first, second and third electrodes cooperatively have the characteristics of a tubular capacitor. At least one of the first and second electrodes is not conductively coupled to any electrode transversely extending into the body.

The dielectric body may define a chip capacitor. In such instance, the first electrode may comprise a surface metallization on a first end of the chip capacitor. The second electrode may comprise a surface metallization on a generally opposite second end of the chip capacitor.

The dielectric body may define a feedthrough capacitor having one or more lead wire passageways therethrough. The first electrode comprises a metallization disposed on a surface of the dielectric body defining a lead wire passageway, or collectively comprise surface metallizations disposed on surfaces of the dielectric body defining a plurality of lead wire passageways. The second electrode comprises an outer surface metallization.

An inductor may be associated with, or integrated into, the hybrid capacitor so as to create a tank filter, also referred to as a band stop filter, for use in magnetic resonance imaging (MRI) and other unique filtering applications.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The present invention resides in a methodology for converting conventional prior art multi-layer feedthrough capacitors into the equivalent of tubular capacitors, so as to create a hybrid discoidal/tubular capacitor, by reducing the effective distance between the opposite termination surfaces or electrodes. More particularly, as will be described more fully herein, the present invention relates to a hybrid capacitor having a design and arrangement of components which gives it both characteristics of a discoidal as well as a tubular capacitor.

Figure 8:
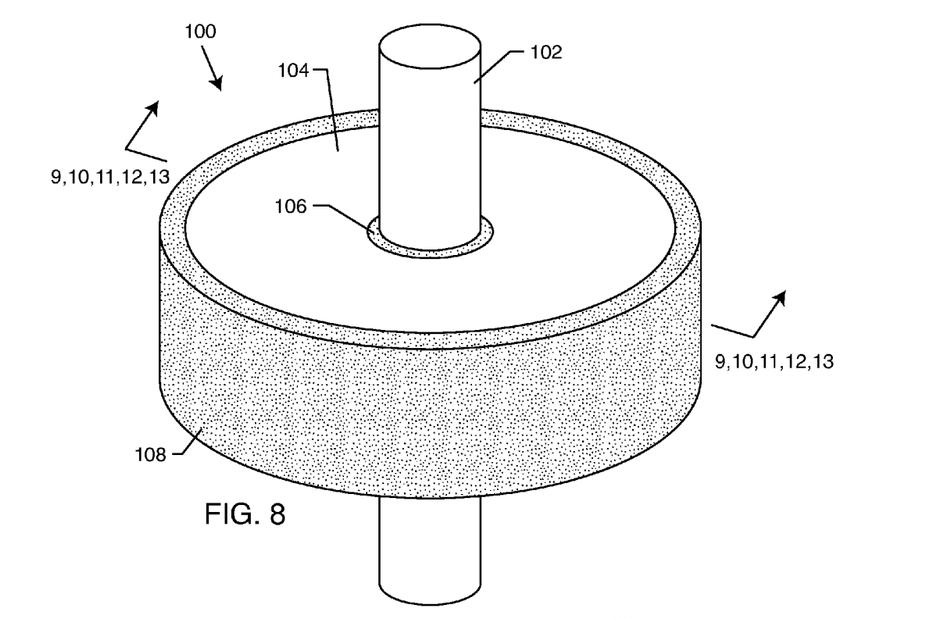
FIG. 8 is a hybrid discoidal/tubular capacitor embodying the present invention.
Figure 9:
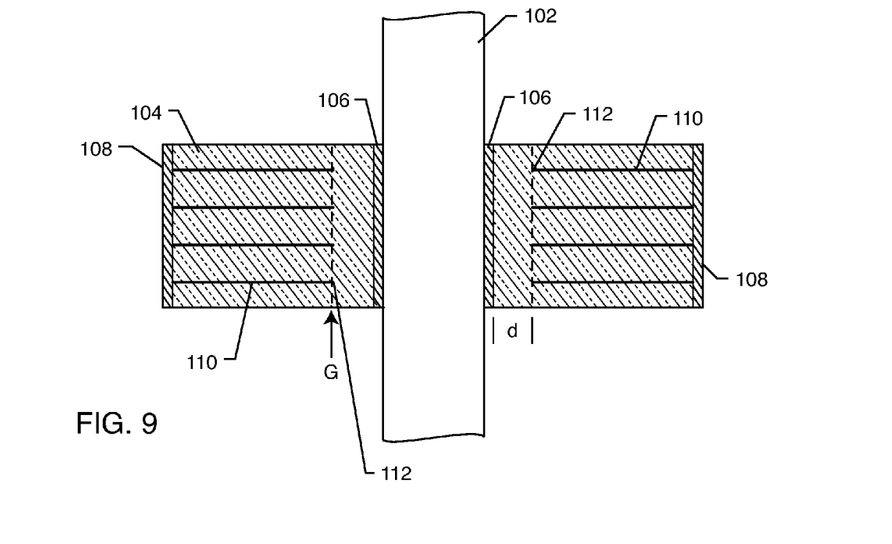
FIG. 9 is a cross-sectional view taken generally along line 9-9 of FIG. 8, illustrating an embodiment of the discoidal/tubular capacitor of the present invention.

With reference now to FIGS. 8 and 9, a novel hybrid discoidal/tubular capacitor 100 is shown. From the exterior, the capacitor 100 has a similar appearance as the prior art unipolar feedthrough capacitor, illustrated in FIG. 1. More particularly, the capacitor 100 includes a passageway extending therethrough through which a lead wire or pin 102 extends. The dielectric body 104 defines the feedthrough capacitor 100, and the passageway through which the lead wire 102 extends. A first electrode 106, in the form of an inner surface metallization lining the passageway, is conductively coupled to the lead wire 102. A second surface which is spaced apart from the inner surface defines an exterior or outer surface which also includes a metallization 108, which serves as a second electrode. Once again, from the exterior, the capacitor 100 looks very similar to a typical multi-layer feedthrough capacitor 10, as illustrated in FIG. 1.

However, when viewing the cross-sectional view (FIG. 9), one skilled in the art will view significant differences between the two. More particularly, there is a third set of electrodes 110, in the form of ground electrode plates, which extend from the exterior surface metallization 108, which serves as a second electrode, transversely through the dielectric body 104 towards the inner metallization 106, or first electrode. However, there are no active electrodes which extend from the inner surface metallization/first electrode 106. Instead, free ends 112 of the plurality of third electrode plates 110 are in spaced relation to the first electrode 106. Preferably, the free ends 112 are generally aligned with one another. If there are a sufficient number of electrode plates 110, then a Gaussian-type cylinder is formed at the electrode tips 116, as illustrated with the dashed line "G". This will result in a relatively uniform electric field that develops between the surface boundary G and the inside diameter metallization or first electrode 106 of the capacitor.

The first and second electrodes, in this case inner and outer metallizations 106 and 108, effectively serve as the electrodes 28 and 38 of a tubular capacitor, as illustrated in FIG. 4. The coupling of the third electrode plates 110 to the second electrode, or outer metallization 108, has the effect of greatly reducing the electrical distance between the first and second electrodes 106 and 108. This creates the equivalent of a very thin-wall tubular capacitor, having a thickness represented by the letter "d", or the distance between the tips or free ends 112 of the third electrode plates 110, and the first electrode inner metallization 106. The result is a hybrid discoidal/tubular capacitor 100 which has characteristics of both a discoidal capacitor and a tubular capacitor. The result is a very high degree of volumetric efficiency achieved for capacitance.

Also, one avoids the problems associated with the prior art as described in FIG. 6 relating to U.S. Pat. No. 6,545,854. More particularly, the problem of having high voltage field enhancements from electrodes facing each other tip-to-tip is avoided. As one can see, the electrodes 110 form a capacitance between the relatively elongated smooth surface of the inside diameter metallization first electrode 106. In this way, the electric fields are not enhanced across the tip to inside diameter surface.

Another major advantage of the structure as shown in FIG. 9 as compared to the prior art extruded tubular capacitors, such as shown in FIG. 4, is that the capacitor 100 illustrated in FIG. 9 is physically very robust and strong. As described above, it is very important, particularly in biomedical applications, that the capacitor be very strong in compression, shear and torsion. The reason for this is that microfractures can occur which can lead to latent defects. For example, in a cardiac pacemaker, the shorting of such a capacitor could lead to the complete failure of the cardiac pacemaker and would, of course, be life-threatening. The capacitor 100 illustrated in FIGS. 8 and 9, due to the form factor, is very strong in compression, torsion and shear, and therefore, is suitable for use with pure platinum electrodes, pure gold or platinum terminations 106 and 108, and is suitable for attachment in biomedical devices by gold brazing or the like.

Figure 10:
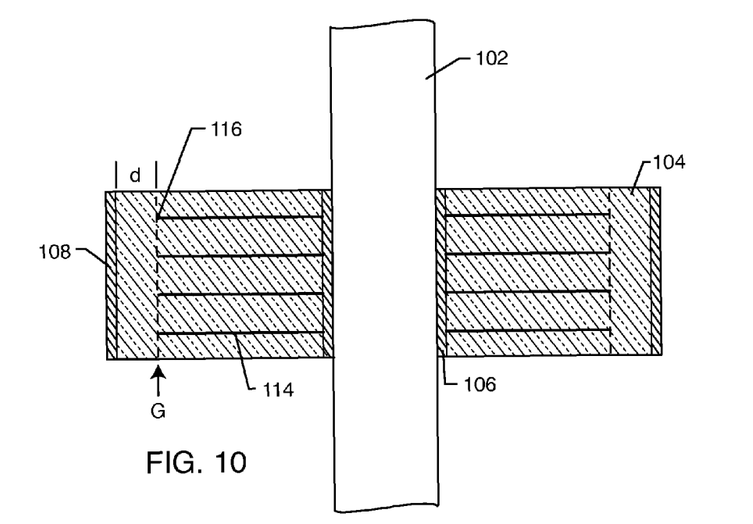
FIG. 10 is a cross-sectional view taken generally along line 10-10 of FIG. 8, illustrating another embodiment of the invention.

Alternate configurations are possible to achieve the same or similar results. For example, as illustrated in FIG. 10, the third electrode plates 114 may be conductively coupled and attached to the inner metallization first electrode 106, and extend transversely through the dielectric material 104 towards the second electrode outer diameter metallization 108. In this case, the electrodes 114 are in the form of active electrodes. However, there are no electrodes, ground or otherwise, which are coupled to or extend from the second outer diameter metallization electrode 108. Instead, a gap "d" is formed between the free ends or tips 116 of the electrode 114, creating a Gaussian-type cylinder and uniform electric field between the generally aligned tips at boundary G and the second electrode 108. The end result is the same as FIG. 9, that is, a tubular capacitor effectively having electrodes 106 and 108 separated by a thickness or distance d, by virtue of the extension of the third electrodes 114. This has all of the advantages previously described in FIG. 9.

Figure 11:
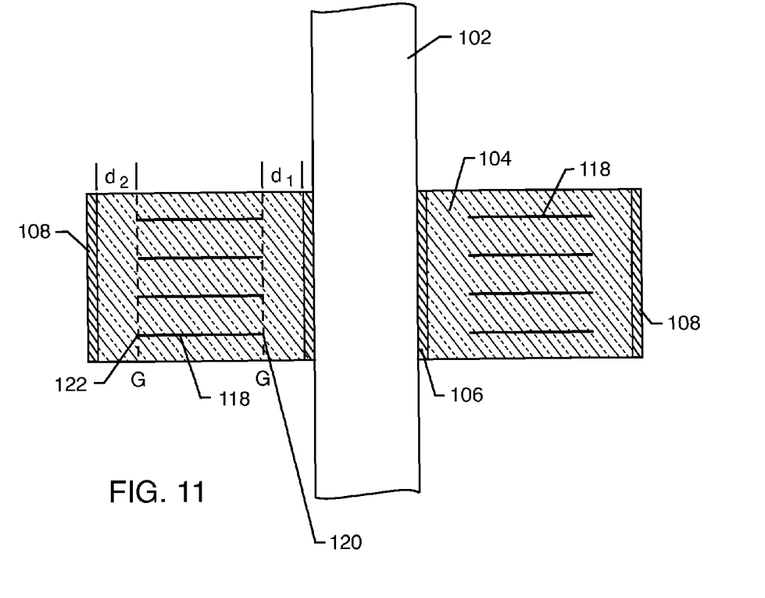
FIG. 11 is a cross-sectional view taken generally along line 11-11 of FIG. 8, illustrating yet another embodiment of the present invention.

With reference now to FIG. 11, an alternative embodiment is shown wherein the third electrodes 118 are not conductively coupled or physically attached to either the first electrode inner metallization 106 or the second electrode outer surface metallization 108. Instead, the electrodes 118 "float" between the first and second electrodes 106 and 108. The electrodes 118 extend transversely through the dielectric material 104, similar to that described above. Moreover, a first set of free ends 120 of the electrodes 118 form a Gaussian-type cylinder at the tips or edges thereof so as to create a uniform electric field between space or gap $d_1$, whereas a second set of free ends or tips 122 of the electrodes 118 form a Gaussian-type cylinder and a generally uniform electric field between their ends 122 and the second electrode 108, the gap or thickness being referred to herein as the $d_2$. This arrangement effectively reduces the electrical distance between electrodes 106 and 108, to the sum of distances or gaps $d_1$ and $d_2$. Moreover, this arrangement still provides the benefits previously described above with respect to FIGS. 9 and 10. This is due to the fact that the first electrode 106, second electrode 108 and third electrodes (110, 114, or 118) cooperatively have the characteristics of a tubular capacitor.

Figure 12:
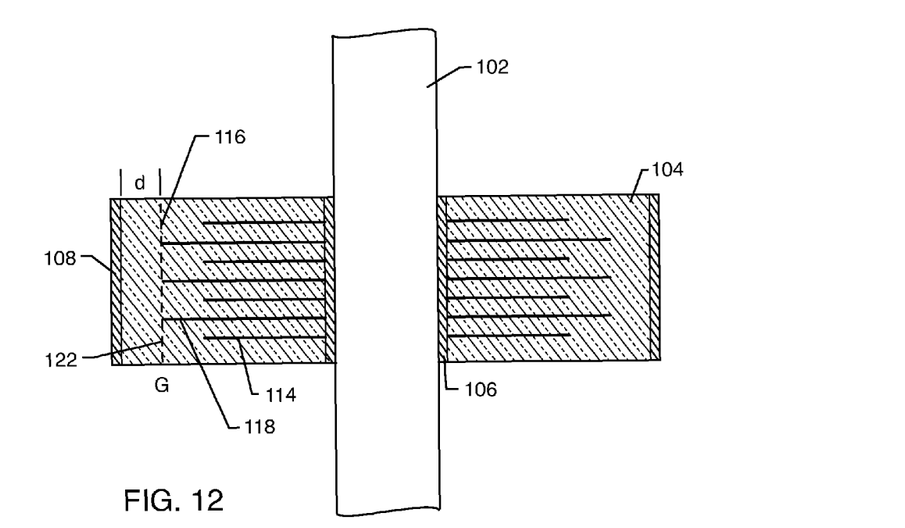
FIG. 12 is a cross-sectional view taken generally along line 12-12 of FIG. 8, illustrating another embodiment of the present invention.

With reference now to FIG. 12, yet another alternative configuration of the present invention is shown. In this embodiment, a first plurality of electrode plates 114 are conductively coupled to and extend from the first electrode 106, in the form of an inner diameter metallization. A second plurality of electrode plates 118, which are not connected or conductively coupled to either the first or second electrode 106 or 108, and thus are "floating" electrodes, are interleaved between the electrodes 114. Electrodes 118 extend to free ends or tips 122, which form a Gaussian-type cylinder surface G, and a resultant gap or space d between the tips 122 and the second outer metallization electrode 108. One can see that this has the effect of putting the capacitance that is formed between electrode plate set 114 and 118 in series with the capacitance that is formed between the Gaussian surface of the electrode tips 122 and the outside diameter metallization electrode 108. This has particular advantages in high voltage applications, in that a voltage divider effect is set up between the two different capacitances.

Figure 13:
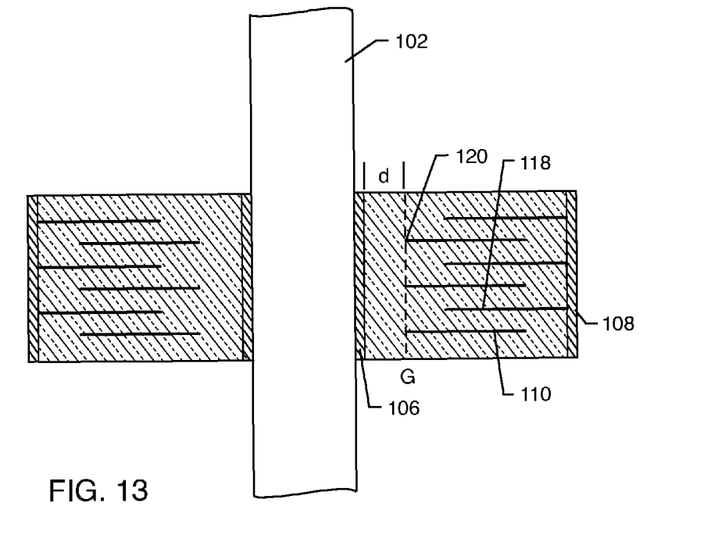
FIG. 13 is a cross-sectional view taken generally along line 13-13 of FIG. 8, illustrating yet another embodiment of the present invention.

FIG. 13 is a cross-sectional view similar to FIG. 12, having the same characteristics and properties of FIG. 12. However, electrode plates 110 extend from the second electrode outer diameter metallization surface 108 towards the first electrode inner diameter metallization 106. Floating electrodes 118 have free ends 120, forming the Gaussian surface, creating a generally uniform electric field between the tips or edges 120 and the first electrode 106.

Figure 14:
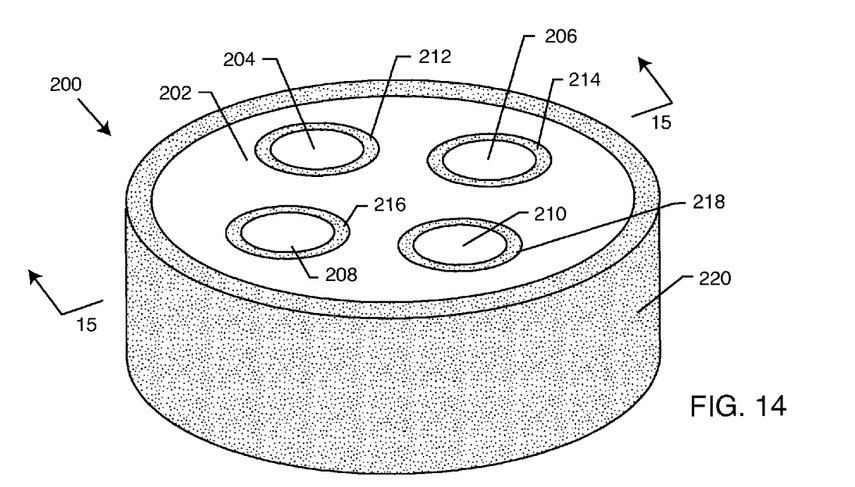
FIG. 14 is a perspective view of a quad-polar feedthrough capacitor embodying the present invention.

With reference now to FIG. 14, a quad-polar feedthrough capacitor 200 embodying the present invention is shown. In this case, the dielectric body 202 defines passageways 204, 206, 208 and 210 adapted for passage of electrical leads or pins (not shown) therethrough. One skilled in the art will realize that the capacitor 200 could be bipolar, hexpolar, or incorporate any other number of feedthrough capacitor through holes. In this case, the inner surface metallizations 212-218 collectively form the first electrode, and the outer surface metallization 220 forms the second electrode.

Figure 15:
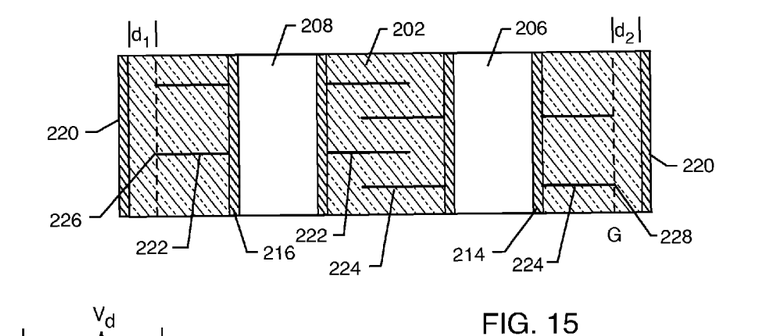
FIG. 15 is a cross-sectional view taken generally along line 15-15 of FIG. 14.

With reference now to FIG. 15, one can see that there are a plurality of electrode plates 222 which are conductively coupled to and extend from the inner surface metallizations or first electrodes 216. These are the equivalent of active electrode plates. However, there are no ground electrode plates, or other electrodes, extending from the second electrode comprising the outer surface metallization 220. In this case, it is convenient to stagger electrode plates 222 with electrode plates 224 to provide the maximum high voltage separation distance. As described above, capacitance is formed between the fringing effect at the tips 226 and 228 of the electrodes 222 and 224 and the ground metallization second electrode 220. As previously mentioned this has great advantages in the distribution of high voltages and avoiding point-to-point contact.

Another advantage of the capacitor 200 shown in FIGS. 14 and 15 is that the overlapping of the electrode plates 222 and 224 prevents the direct penetration of electromagnetic fields through the device. This is particularly important, for example, in implantable pacemaker applications where a cell phone may be held very close to the capacitor 200, for example, in the shirt pocket.

Figure 16:
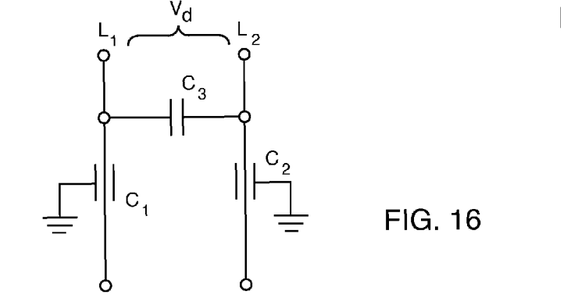
FIG. 16 is a simplified electronic schematic drawing of the capacitor of FIGS. 14 and 15.

Another advantage is that the overlapping of the electrode plates 222 and 224 provide significant capacitance not only to ground, but from lead wire to lead wire. For example, a significant capacitance forms between lead wire through holes 208 and 206. This is better understood by referring to the simplified electronic schematic drawing of FIG. 16. By simplified, not all four through holes are shown from FIG. 14, instead FIG. 16 selectively shows the through holes 206 and 208. Referring to FIG. 16, one can see that the capacitance $C_1$ is formed by the fringe effect tip of the electrode stacks 222 and the outside metallization second electrode 220. Feedthrough capacitor $C_2$ is formed in a similar fashion from the area $d_2$ between the electrode tips 228 of the electrode stack 224. Capacitance $C_3$ is formed by the overlap of the electrodes 222 and 224.

In many electromagnetic filtering applications, it is very important to filter common mode as well as differential mode interference. This is best understood by referring back to a typical pacemaker installation. In a pacemaker, there are normally lead wires in the ventricle and the atrium. These implanted lead wires, when in the presence of a strong EMI emitter, pick up either common or differential mode signals. Common mode signals are shunted to ground and are rendered harmless by feedthrough capacitors $C_1$ and $C_2$. However, when the lead wires are spaced apart, the imposed EMI signals may be of different voltages and also out of phase. This can create a significant voltage to appear between lead wires $L_1$ and $L_2$. This can create a significant voltage to appear in lead wires $L_1$ and $L_2$, shown as $V_d$ in FIG. 16. The presence of capacitance $C_3$ tends to short out such differential signals thereby providing an added degree of protection to the pacemaker or other active implantable medical device. For those skilled in the art, it will be obvious that this applies to any type of electronic device, not just implantable medical devices.

Figure 17:
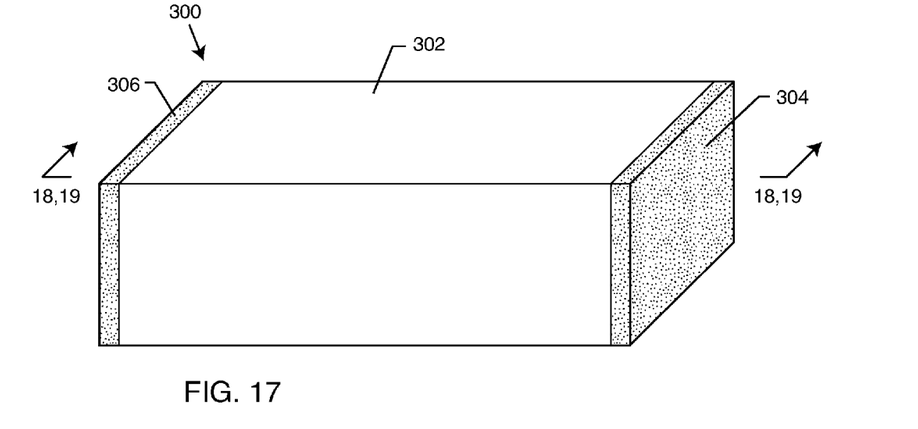
FIG. 17 is a perspective view of a chip capacitor.
Figure 18:
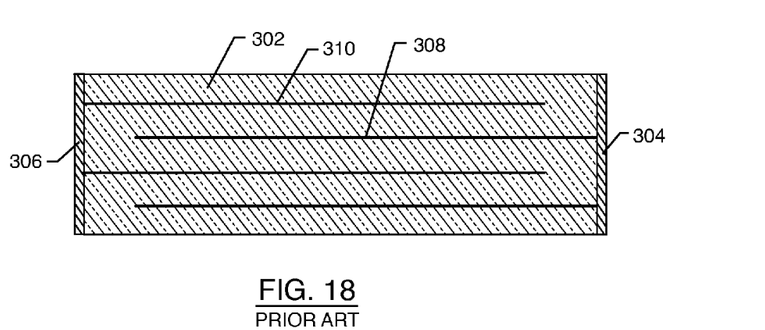
FIG. 18 is a cross-sectional view taken generally along line 18-18, illustrating the prior art arrangement of active and ground electrode plates.

With reference now to FIG. 17, a rectangular MLCC capacitor 300 is shown. Similar to prior art MLCC chip capacitors, the capacitor 300 includes a dielectric body 302 defining the chip capacitor 300. Surface metallizations 304 and 306 are disposed on opposite ends of the capacitor 300. As shown in FIG. 18, in the prior art, electrode plates 308 extend from the conductive termination surface 304, and are in spaced-apart and overlapping relation to electrode plates 310 extending from the opposite metallization termination surface 306. The overlapping of electrode plates 308 and 310 forms the capacitance.

Figure 19:
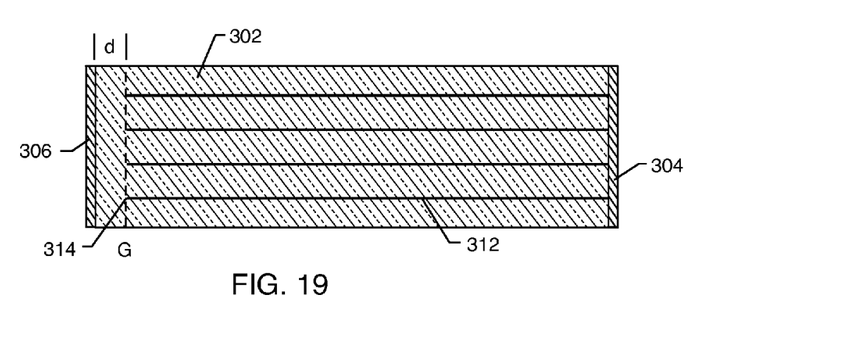
FIG. 19 is a cross-sectional view taken generally along line 19-19 of FIG. 17, illustrating internal electrode plate arrangement, in accordance with the present invention.

With reference now to FIG. 19, a novel adaptation of the capacitor 300 embodying the present invention is shown. In this case, similar to that described above, a plurality of electrode plates comprising a third electrode extend from a single surface metallization termination surface, either the first or second electrode 304 or 306, in generally spaced apart and parallel relationship. Preferably, the tips 314 of the electrodes 312 are generally aligned with one another so as to be generally equally spaced apart from the first or second electrode, in this case second electrode termination surface 306. The Gaussian surface G is formed along the dash line where the tips or ends 314 of the electrodes 312 terminate due to the electric field fringe effects at the electrode tips 314. Therefore, the distance between the electrode tips 314 and the metallization surface or second electrode 306 forms a capacitance similar to the tubular capacitance previously described above. This has the effect of converting the chip capacitor into a tubular-type capacitor with greatly reduced distance d between the opposed metallization surfaces or electrodes 304 and 306. This arrangement has all the advantages previously described above of the invention.

Figure 20:
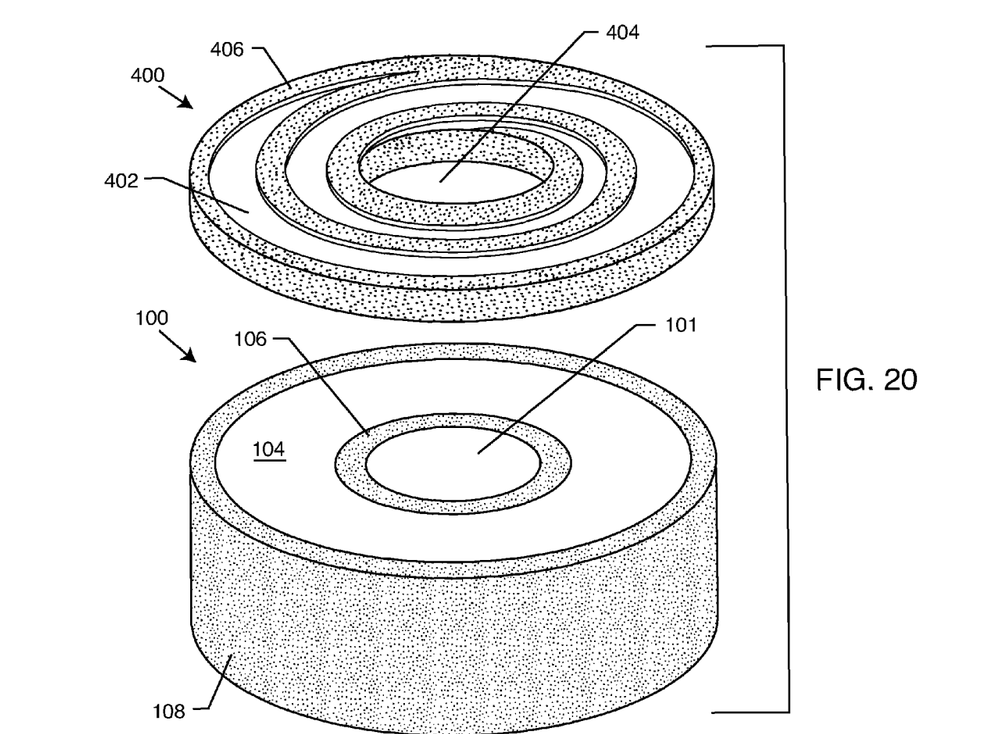
FIG. 20 is a partially exploded and perspective view illustrating a capacitor embodying the present invention coupled with an inductor.

With reference now to FIG. 20, U.S. application Ser. No. 11/558,349 describes that chip and feedthrough capacitors can be adapted in a variety of ways, for example, to manufacture a parallel resonant tank filter, or band stop filter, for use in MRI and other unique filtering applications. The hybrid capacitors of the present invention can similarly be modified or associated with an inductor element. With reference to FIG. 20, the capacitor 100 illustrated is similar to that described above with respect to FIG. 8. That is, the capacitor 100 includes a through hole or passageway 101 adapted to receive an electrical lead 102 therethrough in conductive relationship with a first electrode or inner surface metallization 106. One or more electrodes, typically a plurality of electrode plates, extend transversely through dielectric material 104 towards the second electrode or outer surface metallization 108, in any of the arrangements discussed above with respect to FIGS. 9-13. Of course, the capacitor 100 could comprise any capacitor incorporating the teachings of the present invention.

Figure 21:
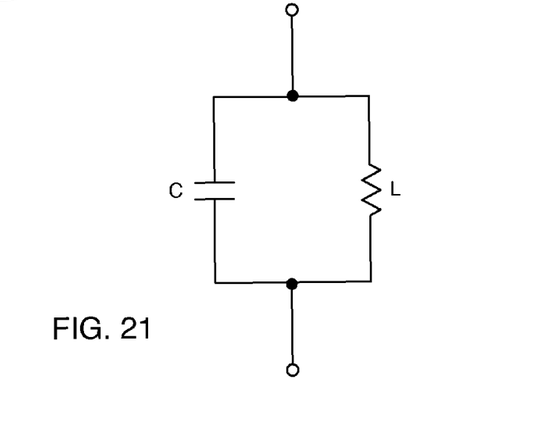
FIG. 21 is a simplified electronic schematic of the structure of FIG. 20.

An inductor 400 comprised of a thin substrate material 402 defining an aperture 404 in alignment with the through hole or passageway 101 of the capacitor 100, and having a spiral circuit trace 406 is associated, such as in stacked relationship, with the capacitor 100. The inductor structure 400, as shown in FIG. 20, is convenient for co-bonding to the capacitor structure 100. When these two are co-bonded and electrically conducted together, they form a parallel resonant tank circuit, as shown in the schematic of FIG. 21.

By placing the inductor 400 in the capacitor 100 elements in parallel, the structure becomes a band stop filter that will resonate at a particular frequency or frequency range. At resonance, this provides a very high impedance. This is particularly useful in certain applications where there is a powerful EMI emitter at one particular frequency. For example, when a pacemaker is subjected to magnetic imaging procedures, it is exposed to a very powerful RF pulsed field. This is fully described in U.S. patent application Ser. Nos. 11/558,349 and 11/423,073, the contents of which are incorporated herein by reference. It will be obvious to those skilled in the art that the novel hybrid discoidal/tubular capacitors of the present invention can be adapted for use in tank filters in accordance with the teachings of U.S. application Ser. Nos. 11/558,349, 11/423,073 and U.S. Pat. No. 6,701,176. More particularly, the capacitor structures illustrated in FIGS. 115, 117, 118, 125, 130-134, 140-144, 148-151, 156-159 and 161 of U.S. application Ser. Nos. 11/558,349, 11/423,073 and U.S. Pat. No. 6,701,176 can all be constructed using the principles of the novel hybrid discoidal/tubular capacitor as described herein. Moreover, the capacitors illustrated and described herein can all be modified to incorporate inductive elements, or be associated or co-bonded with inductors to create tank filters resonant at a particular frequency or frequency range.

Although several embodiments have been described in some detail for purposes of illustration, various modifications may be made without departing from the scope and spirit of the invention. Accordingly, the invention is not to be limited, except as by the appended claims.

What is claimed is:

1. A hybrid capacitor, comprising:
   a body of dielectric material having spaced-apart first and second surfaces;
   a first electrode associated with the first surface;
   a second electrode associated with the second surface; and
   a plurality of third electrodes transversely disposed within the dielectric body between the first and second electrodes;
   wherein free ends of the plurality of third electrodes are in generally equally spaced relation to at least one of the first and second electrodes;
   wherein the first, second and third electrodes cooperatively have the characteristics of a tubular capacitor; and
   wherein at least one of the first and second electrodes is not conductively coupled to any electrode transversely extending into the body.

2. The capacitor of claim 1, wherein the third electrodes are disposed within the dielectric body without conductive coupling to the first or second electrodes.

3. The capacitor of claim 1, wherein the third electrodes are conductively coupled to the first electrode.

4. The capacitor of claim 1, wherein the third electrodes are conductively coupled to the second electrode.

5. The capacitor of claim 1, wherein the third electrode comprises a set of electrode plates.

6. The capacitor of claim 5, wherein a first plurality of the electrode plates are conductively coupled to either the first or second electrode, and a second plurality of the electrode plates are interleaved with the first plurality of electrode plates and are not conductively coupled to either the first or second electrode.

7. The capacitor of claim 1, wherein the dielectric body defines a chip capacitor.

8. The capacitor of claim 7, wherein the first electrode comprises a surface metallization on a first end of the chip capacitor, and the second electrode comprises a surface metallization on a generally opposite second end of the chip capacitor.

9. The capacitor of claim 1, wherein the dielectric body defines a feedthrough capacitor.

10. The capacitor of claim 9, wherein the first electrode comprises a surface metallization disposed on a surface of the dielectric body defining a lead wire passageway, and the second electrode comprises an outer surface metallization.

11. The capacitor of claim 1, wherein the dielectric body defines a feedthrough capacitor having a plurality of lead wire passageways therethrough.

12. The capacitor of claim 11, wherein the first electrode collectively comprises surface metallizations disposed on surfaces of the dielectric body defining the plurality of lead wire passageways, and wherein the second electrode comprises an outer surface metallization.

* * * * *